INVENTOR
ALBERT C. REID

BY McLean, Morton & Boustead

ATTORNEYS

INVENTOR
ALBERT C. REID

United States Patent Office 3,447,126
Patented May 27, 1969

3,447,126
RECORDING TECHNIQUE FOR ELIMINATING PERIODIC NOISE FROM SEISMIC SIGNALS
Albert C. Reid, Tulsa, Okla., assignor to Sinclair Research, Inc., New York, N.Y., a corporation of Delaware
Filed July 19, 1967, Ser. No. 654,457
Int. Cl. G01v 1/00
U.S. Cl. 340—15.5                    5 Claims

ABSTRACT OF THE DISCLOSURE

A method of recording on magnetic tape a seismic signal produced by a manmade disturbance on or near the earth's surface utilizing one or more, e.g. two rotating drums and including a micro-track magnetic taperecorder whereby an unwanted noise freqency is cancelled from the signal comprising recording the signal on tape during a normal length of recording time or distance such as one revolution of the drum, the recording including an even multiple of the period of the unwanted frequency, recording on the tape with reversed polarity during a second length of recording equal to the first length such as a second revolution of the drum without alteration of drum speed a multiple of the period of the unwanted frequency, and summing the first and second recordings to provide a resultant with the unwanted frequency cancelled out.

---

In recent years with the advent of more sophisticated geophysical prospecting devices and with greater expertise upon the part of interpreters of seismic recordings, even the smallest divergence from the undistorted shape of the recorded signal due to undesired interference will many times lead to costly errors. Because seismic signals are normally low frequency thereby necessitating low frequency band pass filters within the channels, low frequency interference is extremely troublesome and very difficult to eliminate. The most common low frequency interference encountered in seismic recording is the sixty cycle disturbance of the power line and the distortion associated with it.

Sixty cycle noise is particularly disturbing in seismic prospecting techniques employing magnetic tape records, such as "Deca-track" or "Micro-track" wherein the reflected energy from a number of manmade seismic disturbances is recorded and summed to produce a single usable seismic trace. In "Deca-track" or "Micro-track" recording, each disturbance is detected in turn by a group of earth seismometers, and their small electric signals are recorded in very narrow tracks on magnetic tape in a close side-by-side relationship. A larger read-out head that covers these several tracks is used to play back this information and record the summation as a single track, on a new tape as a permanent data record. This operation results in an improved signal-to-noise ratio if the noise be spurious, wind, rain, etc., and the deep earth returned energy will be summed and strengthened. In so doing, however, many times 60-cycle noise is, by chance, summed to provide a signal-to-noise ratio that is intolerable. It is also true that if the associated amplifiers have "Automatic Gain Control" (AGC) the unwanted 60-cycle noise, many times, will cause the amplifiers to operate in a fixed gain condition which permits the seismic signals to be hopelessly buried.

The usual method employed to minimize interference, such as 60-cycle noise, is to install "notch" filters, active or passive, designed to reduce such interference. However, not only are such filtering elements costly, but their use within a signal circuit produces objectional side effects, such as the generation of pulses and phase changes that are foreign to the original seismic signal train, thereby distorting the seismic signal train.

It is an object of this invention to provide a method of recording seismic signals wherein an unwanted frequency is eliminated without the use of filtering elements. This and other objects of this invention are accomplished by recording the seismic information and unwanted frequency such as 60-cycle noise, during a normal length of recording time or distance such as a first revolution of the recording drum, or on the first track of a Deca-track. The polarity of the head of the recorder is then reversed and the drum continues to run for a second normal length of recording equal to the first length such as a second revolution of the drum with only the unwanted frequency being recorded upon this second track. The speed of the drum needs to be adjusted such that a single rotation includes an integral multiple of the period of one cycle of the unwanted frequency and, preferably the two lengths of recording are initiated at the same drum position. Also, the gain of the recording amplifier should be identical to that employed on the first rotation. The two recorded signals are then summed to produce a resultant which is free from the unwanted frequency and its distortion. With the speed of the drum fixed in this manner the recorded unwanted frequency noise has an out of phase relation across the recorded tape, so long as the drum continues in motion. In actual practice, the first recording is made containing the seismic signal, including the ambient noise frequencies, and then the second recording is made containing only the ambient noise frequencies. Summation of these two recordings cancels the out-of-phase frequencies.

For a more complete understanding of this invention, reference is made to the appended drawings in which FIGURES 1 to 3 illustrate the problems which can arise with existing recording apparatus;

Figure 1:
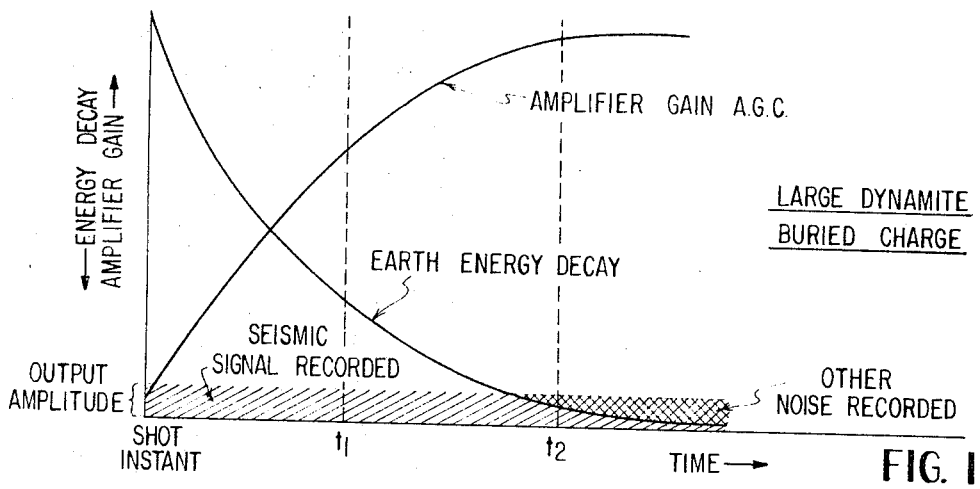

To better describe the noise problem which can arise with existing recording apparatus, FIGURE 1 shows a typical "Earth Energy Decay" graph along with the AGC amplifier gain to establish a near constant amplitude signal output for recording on magnetic tape. Since this example is of a large buried charge, the earth energy persists from the shot instant until some extended time $t_2$ at which the noise begins to control the gain of the amplifier, the amplifier gain becomes fixed, permitting the amplitude of the recorded earth energy to decay at its usual rate while the output noise becomes a constant amplitude. This condition can sometimes be delayed by shooting a larger charge. FIGURE 2 again is an Earth Energy Decay graph of a much smaller manmade disturbance. The final gain of the amplifier in a recording system with such a disturbance is usually increased and in a much shorter time $t_1$ the noise causes gain of the AGC amplifier to become fixed. If the noise is 60-cycle the seismic signal, as stated, becomes hopelessly lost. This is true even if many disturbances have been Deca-track summed. FIGURE 3 is a graph of the same Earth Energy Decay as described in FIGURE 2. The amplifier in this case has "Pre-Programmed Gain," which has been established by trial, to cause the Earth Energy or deep seismic signal output to be of practically a constant amplitude for recording on tape. The "Other Noise" as recorded by Deca-track may be of large amplitude, but if it is of a random nature the amplitude obtained during a summation should increase at a rate substantially below that of the deep earth signals. If the other noise, as shown in FIGURE 3, is mostly 60-cycle power-line noise, this can be cancelled out by the preferred method of recording of this invention.

Figure 4:
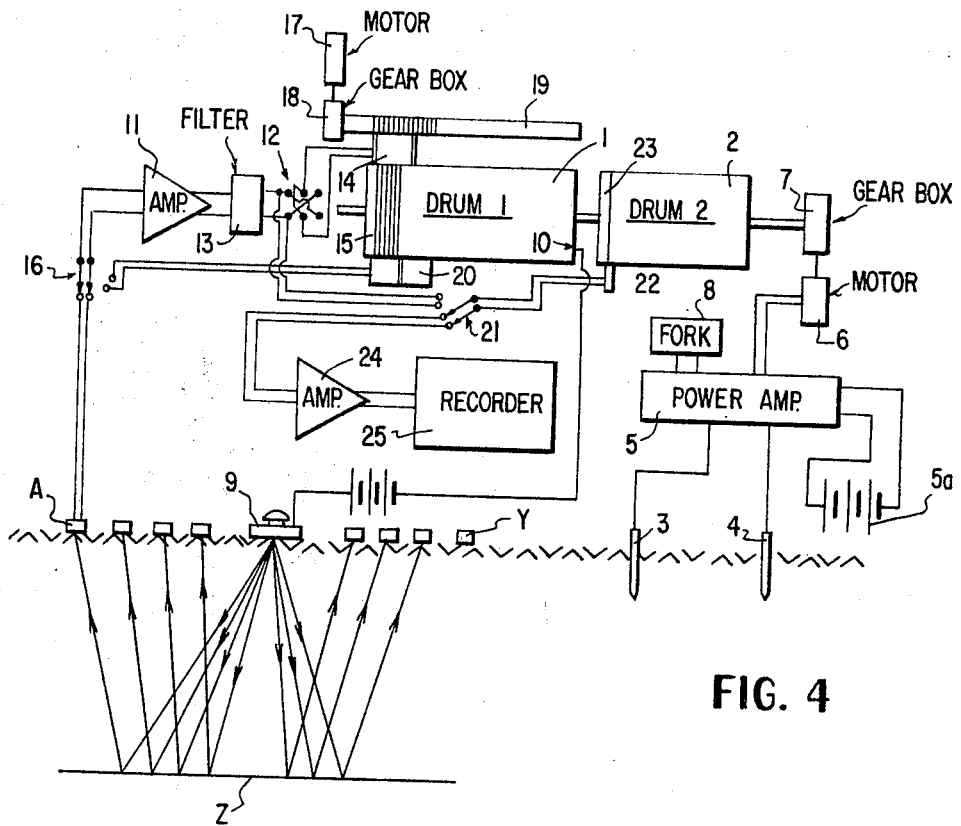
FIGURE 4 illustrates a system in accordance with this invention.

The instrumentation for accomplishing this preferred method of the invention is illustrated in FIGURE 4. In this system the drum assemblies 1 and 2 rotate at a speed such that one rotation in time is an integral multiple of the period of the unwanted frequency. In the case of 60-cycle noise the period is 16⅔ milliseconds. This permits an integral number of cycles of 60-cycle noise to be recorded per revolution in Deca-track operation and assures an in-phase relation across the tape if the drum continues to run once started. Referring again to FIGURE 4, probes 3 and 4 are driven into the earth, e.g. 20 to 50 feet apart to pick up the motor drive frequency. Probes 3 and 4 should provide about 20 to 50 microvolts between them as the driving frequency which is the input signal to power amplifier 5 and its associated battery 5a to provide synchronous motor 6 with the necessary power through gear box 7 to drive drums 1 and 2. The method of this invention can also be satisfied by driving drums 1 and 2 from fork 8 if its frequency is adjusted accurately to that of the noise frequency. If there is no noise frequency problem, then the power amplifier can be driven normally with 60-cycle fork 8, and other aspects of the operation revert back to a normal operation.

If an unwanted frequency is present, such as 60-cycle, then the magnetic recorder is switched on to record Deca-track. The usual spread of seismometer groups is shown A to Y in FIGURE 4 by groups in a split spread configuration. The exploder 9, for example, an exploder such as described in U.S. Patent 3,314,497, is placed in the center of groups A to Y and its firing is initiated by switch 10 on drum 1. This switch is adjusted to fire the exploder every odd revolution of drum 1, with a pulse provided by a switch (not shown) on this drum coincident in time with this shot instant which provides a pulse each revolution of drum 1 to initiate the pre-programmed gain cycle of amplifier 11. Switch 12 is also prepared by a switch (not shown) on the drum to be closed in a proper polarity with regard to seismic signals, and direct the output of the amplifier 11 through the usual filter network 13 to Deca-track head 14 preparatory for recording the first track 15 of energy from group A (other channels not shown for simplicity.

The preferred routine now follows. The record button is pressed which starts drums 1 and 2. Switch 10 will fire exploder 9, which will initiate a recorded shot instant and cause energy to radiate from the exploder. Some energy will be reflected from deep earth strata Z and be detected by seismometer group A causing an electric signal train to proceed through amplifier 11 and be recorded by Deca-track head 14 on the first track 15 of the magnetic tape. Since ambient, e.g. 60-cycle noise was intermingled with seismic signal from group A the drums 1 and 2 must remain running for a second revolution, which results in a twice normal record length recording. Preceding the start of the second revolution of drums 1 and 2, amplifier 11 is reset to its initial condition, e.g. to its initial gain as before the first revolution, by a drum switch (not shown). Switch 12 is reversed and stepping motor 17 actuated by a drum switch (not shown) through gear box 18 to turn shaft 19 and move Deca-track head 14 over to a new track to record the second revolution or the second normal record length. The pulse that is coincident in drum position with the shot instant, as on the first revolution, causes amplifier 11 to retrace the same gain cycle as on the previous revolution. The exploder is idle and the signal recorded on this second revolution is of the ambient, e.g. 60-cycle noise and in reversed polarity. This operation can be repeated many times to build up the seismic signal so that drum revolutions 1, 3, 5, etc. record seismic signals and 60-cycle noise, while revolutions 2, 4, 6, etc. record only ambient noise with reversed polarity.

Figure 2:
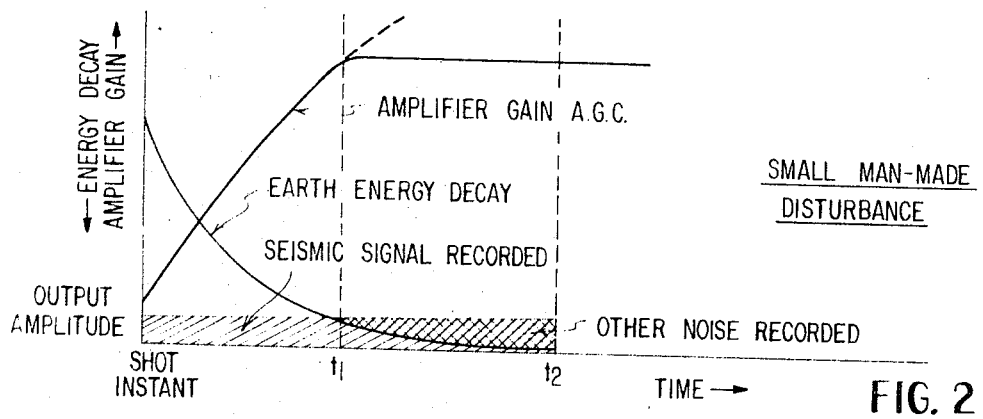
Figure 3:
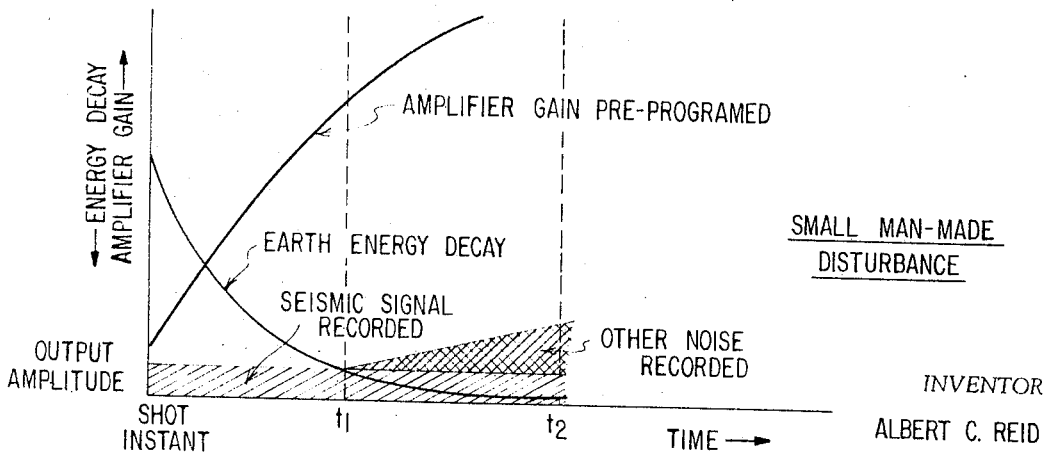
Figure 5:
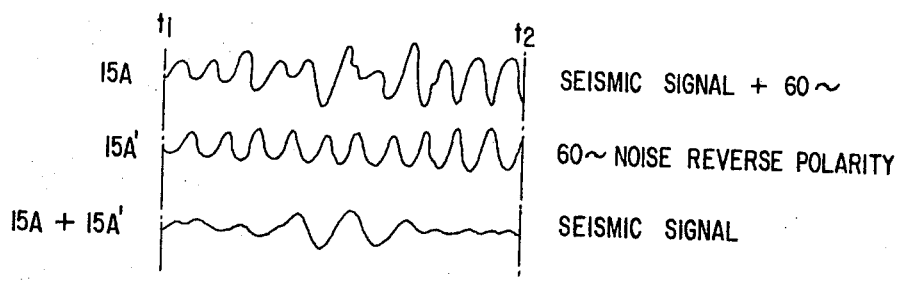
FIGURE 5 illustrates the time and amplitude arrangement of waveforms, using the preferred method of this invention.

A playback of the two Deca-tracks individually recorded as described above and across a time window $t_1$ to $t_2$ as previously mentioned, with regard to FIGURES 2 and 3, results in a "wiggle trace" record as shown in FIGURE 5. Trace 15A includes 60-cycle noise with seismic signals, while 15A′, or the second Deca-track recording is 60-cycle noise in reversed polarity. For the sake of simplicity these two Deca-tracks can be summed as recorded above by the preferred method of operation even though in general practice the Deca-track group might be recorded before summing. Summing can be accomplished by throwing switch 16 to replay the first Deca-track group through head 20 (only the first two tracks having been recorded here), preparing amplifier 11 for fixed gain recording, returning the output of this amplifier through filter network 13 to head 22 through a closed switch 21 and recording the summation of the first Deca-track group from drum 1 to drum 2 by activating the drums for one revolution. The summed recording track 23 can then be replayed from track 23 through head 22, through a closed switch 21, recording amplifier 24 to "wiggle trace" recorder 25 and obtain the resultant of 15A+15A′ as summed in FIGURE 5 for the same time window $t_1$ to $t_2$ as previously described. The regular fork 8 can be used for all of the later operations to actuate the drum drive motor 6.

It is evident that by the use of this preferred method of tape recording that a seismic signal can be lifted out of a high amplitude noise frequency even though this noise frequency is greatly distorted. This can be accomplished as a field operation and the permanent seismic data record be void of this noise. It is well known that certain operations of this method can be reversed, such as using a noise signal on the first Deca-track and noise and seismic signal on the second Deca-track, and will eliminate the noise frequency as effectively as the method described above. It is also known and considered a part of this disclosure that one may arrange the speed of the drums such that the time for one revolution (one normal record length in time) is an integral number+½ period of the unwanted frequency. This can be provided by gear ratios of the drum and motor and thereby dispense with reversing switch 12 of FIGURE 4. Most of the unwanted frequency noise, as well as all odd harmonics of the noise signal, will be cancelled. Other aspects of the operation would be similar to the method described in the body of this disclosure.

It is also known and considered a part of this disclosure that to establish a normal record length time equal to an integral number+½ period of an unwanted frequency, will result in an out of phase relation, one recording to the next, of this unwanted frequency so long as these recordings are continuous. By this procedure then with reference to Deca-track recording, records 1, 3, 5, 7 and 9 will exhibit the unwanted frequency with an in-phase relation across the Deca-track group, while records 2, 4, 6, 8 and 10 will exhibit this frequency 180° out of phase with the odd recordings. The associated amplifier gain function must be repeated for each recording. The summation then of an even number of recordings will cancel the sine wave portion of the unwanted frequency including all odd harmonics. This procedure then permits recording wanted signal intermingled with unwanted noise on each normal record length.

I claim:

1. A method of recording electric signals on a multi-track magnetic tape, whereby an unwanted noise frequency therein is cancelled, comprising recording the signals on a first track of the tape in one normal-length recording equaling an even multiple of the period of the noise frequency, thereafter recording on a second track of the tape during another normal-length recording without alteration of recording speed and with opposite polarity the noise, and subsequently summing the two recordings to provide an output in which the noise frequency is cancelled.

2. The method of claim 1 wherein said tape is rotated on a revolving drum and each rotation thereof includes an even number of periods of the noise frequency, and further including recording the signal during one revolution of the drum and recording the noise frequency during a second revolution of the drum.

3. The method of claim 2 including recording on a plurality of tracks at a first amplifier gain a plurality of the signals including the noise frequency and on an equal number of tracks the noise frequency with the same amplifier gain, and summing the two sets of recording so produced.

4. The method of claim 3 wherein the plurality of signals are seismic signals obtained from a plurality of geophones.

5. A method of recording electric signals on a multi-track magnetic tape, whereby an unwanted noise frequency therein is cancelled, comprising recording the signals on a first track of the tape in one normal-length recording equaling an even multiple plus one-half of the period of the noise frequency, thereafter recording on a second track of the tape during another normal-length recording without alteration of recording speed the noise, and subsequently summing the two recordings to provide an output in which the noise frequency is cancelled.

References Cited

UNITED STATES PATENTS 2,397,579    4/1946    Ueritch.
2,438,217    3/1948    Johnson     340—15.5

RODNEY D. BENNETT, JR., *Primary Examiner.*

C. E. WANDS, *Assistant Examiner.*

U.S. Cl. X.R.

179—100.2